Dec. 30, 1969   K. C. MERRELL   3,487,300
CAPACITANCE TO CURRENT TRANSDUCER EMPLOYING CAPACITOR
CHARGED TO PRESET VOLTAGE BY CONSTANT CURRENT AND
FEEDBACK CURRENT RELATED TO CAPACITANCE CHANGE
Filed Sept. 18, 1967                 2 Sheets-Sheet 1

INVENTOR
KENNETH C. MERRELL

BY Sughrue, Rothwell, Mion,
Zinn & Macpeak
ATTORNEYS

Dec. 30, 1969 K. C. MERRELL 3,487,300
CAPACITANCE TO CURRENT TRANSDUCER EMPLOYING CAPACITOR
CHARGED TO PRESET VOLTAGE BY CONSTANT CURRENT AND
FEEDBACK CURRENT RELATED TO CAPACITANCE CHANGE
Filed Sept. 18, 1967 2 Sheets-Sheet 2

INVENTOR
KENNETH C. MERRELL

BY Aughus, Rothwell, Mion,
Zinn & Macpeak
ATTORNEYS

United States Patent Office 3,487,300
Patented Dec. 30, 1969

3,487,300
CAPACITANCE TO CURRENT TRANSDUCER EMPLOYING CAPACITOR CHARGED TO PRESET VOLTAGE BY CONSTANT CURRENT AND FEEDBACK CURRENT RELATED TO CAPACITANCE CHANGE
Kenneth C. Merrell, Brea, Calif., assignor to Robertshaw Controls Company, Richmond, Va., a corporation of Delaware
Filed Sept. 18, 1967, Ser. No. 668,338
Int. Cl. G01r 27/26
U.S. Cl. 324—60                                4 Claims

ABSTRACT OF THE DISCLOSURE

A capacitance to current transducer capable of operating over wide ranges of terminal or starting capacitance values as well as large variations in span or capacitance changes. The capacitor is charged a constant amount of time by a constant current plus feedback current to a pre-set voltage. The feedback current is derived from an output current resulting in a proportionality between capacitance changes and output current changes.

---

A capacitance to current transducer otherwise known as a capacitance transducer may typically be used in conjunction with sensing probes or rods providing a fixed or varying capacitance signal in proportion to product material level or proximity. The output, which is a D.C. voltage proportional to capacitance changes may be used to indicate, record or control the material level or proximity.

The present invention is operable over a wide range of terminal capacitance settings and a wide variation in capacitance changes. The former is referred to as the zero or zero percent of the system and the latter is referred to as the span of the system. Both the zero and span are adjustable by potentiometers within the system and as a result of the novel circuitry of the invention, the span and zero adjustments can be made without any interaction.

The present invention operates to provide a non-zero based D.C. output current. A constant current generator charges the variable capacitance which is discharged when it reaches a predetermined voltage. The charge-discharge frequency is converted to a D.C. level voltage which is applied to a high gain error differential amplifier. The latter provides an output which drives an output current amplifier to provide an output current. The output current is in series with a feedback resistor which developes a feedback voltage which is applied to one input of a span generator. The latter, being a differential amplifier receives at a second input a null voltage. The latter is controlled by a potentiometer and applied through a span adjust potentiometer. The current output of the span generator adds to the constant current input to the capacitor.

The null potentiometer is adjusted so that at zero percent or capacitance starting value the output current from the span generator is zero causing all charging current at zero percent condition to come from the constant current generator. This is accomplished by adjusting the null potentiometer so that the null voltage equals the feedback voltage at zero percent conditions. Thus, at zero percent conditions no current flows through the span adjust potentiometer and it can be adjusted without affecting the zero percent conditions.

Figure 1:
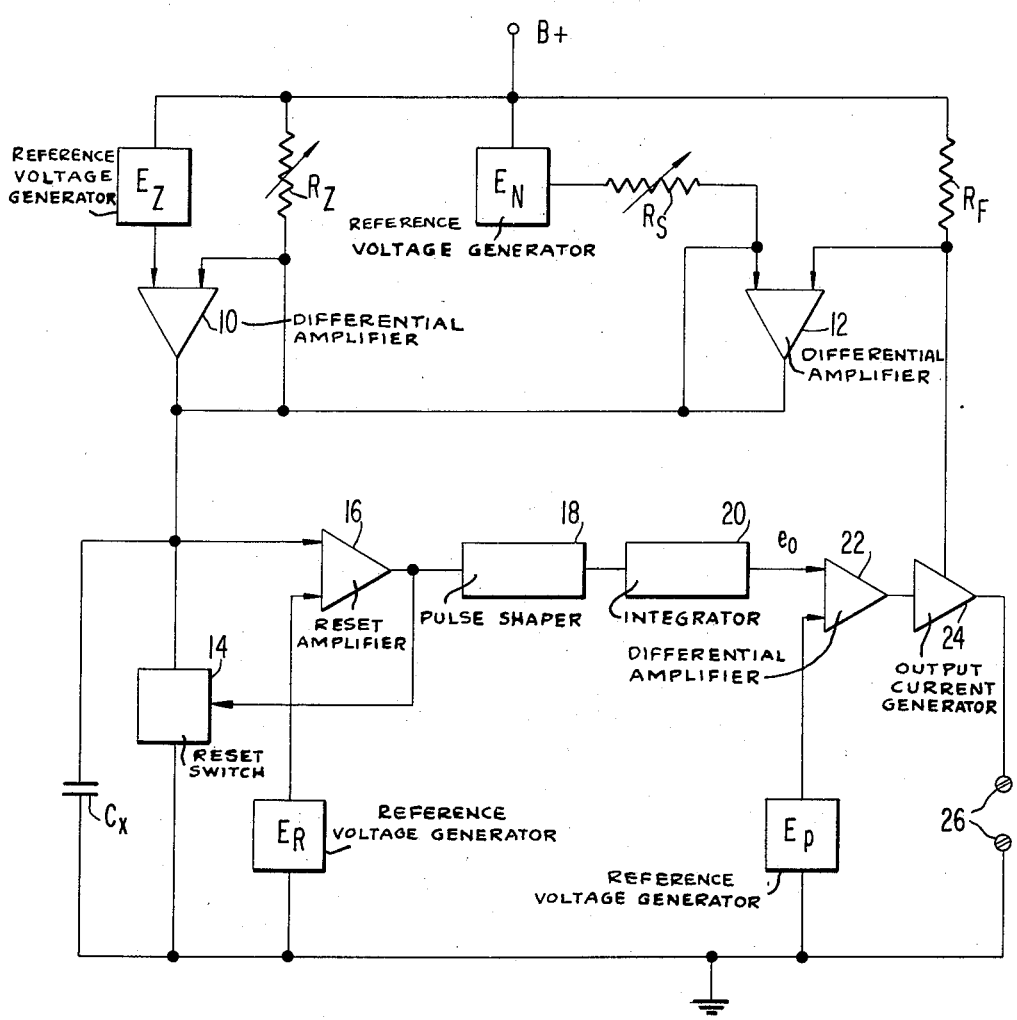
Figure 2:
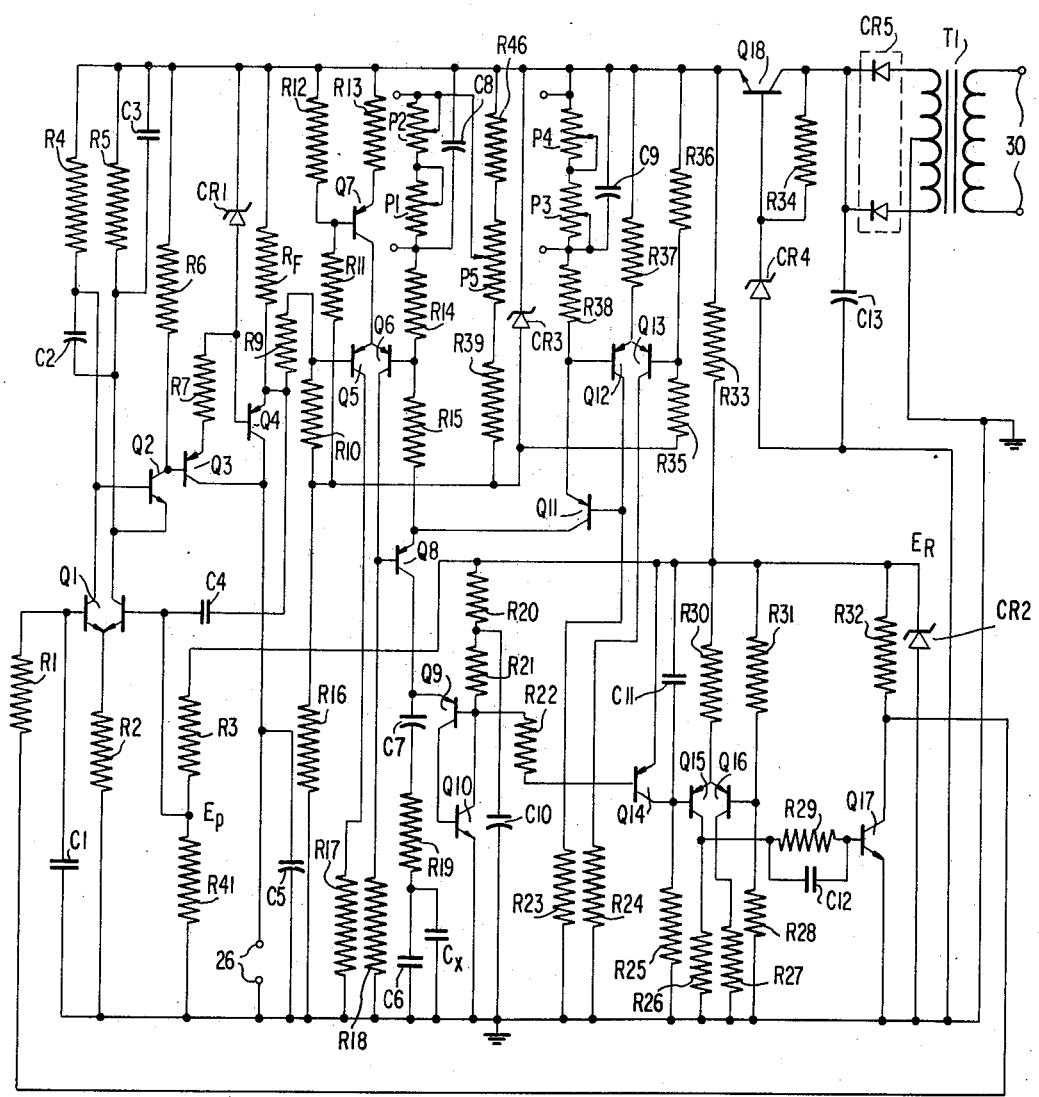

A complete understanding of the invention may be had by referring to the following detailed explanation of a preferred embodiment thereof and the drawings wherein:

FIGURE 1 is a partial block diagram of a preferred embodiment of the invention; and
FIGURE 2 is a schematic of a preferred embodiment of the invention.

The basic circuit concept of the apparatus illustrated in FIGURE 1 is one in which an unknown and varying capacitance $C_X$ is charged to a fixed voltage $E_R$ in a fixed time T, by adjusting the magnitude of a constant current charging source I, and may be expressed as:

$$I = \frac{E_R C_X}{T}$$

It can be seen from the above equation that as the period T and the charge voltage $E_R$ are held constant, the change in charging current $\Delta I$ is directly proportional to the change in capacitance $\Delta C_X$. In the present invention, the added charging current necessary to maintain the period and voltage substantially constant over variations in capacitance is derived from the net output current signal.

The initial charge to the capacitance, $C_X$, is provided by a constant current generator which comprises a current output transconductance differential amplifier 10, having a reference voltage $E_Z$ input and a current feedback. The feedback is controlled by the variable resistance $R_Z$. The output current from the constant current generator produces a linear ramp voltage developed across capacitor $C_X$ until the ramp voltage equals the reset amplifier reference votlage $E_R$, at which time the reset amplifier 16 provides an output signal which turns on the reset switch 14 thereby providing a discharge path for the charge on capacitor $C_X$. The capacitor is quickly discharged causing reset switch 14 to be turned off followed by a re-charging of capacitor $C_X$. The resultant wave form developed across capacitance $C_X$ is a sawtooth with a peak amplitude equal to the reset reference votlage $E_R$ and a charging time or period T proportional to the charging current and a capacitance value. The reset amplifier 16 provides a short output pulse each time the voltage across capacitance $C_X$ reaches the reference value $E_R$. The reset pulses are applied to a reset pulse shaper 18 which provides a constant amplitude and width output pulse in response to each input reset pulse. The shaped pulses from pulse shaper 18 are applied to an integrator whose output is a D.C. voltage which is proportional to the reset pulse frequency, or inversely proportional to the charging time T. The D.C. output voltage from integrator 20 is then coupled to one input of a high gain differential error amplifier 22, the other input being connected to a fixed voltage reference source $E_P$. The single ended output from the error amplifier 22 occurs when the integrator output voltage $e_0$ is less than the error amplifier reference voltage $E_P$. The output from the error amplifier 22 drives an output current generator 24 which supplies the D.C. output signal $I_0$ to the external load (not shown) which is connected between output terminals 26. The output terminals 26 are in series with the feedback resistance $R_F$ which develops a feedback voltage which is a function of the output current.

The feedback voltage is applied as one input to a span generator 12 which is a differential input, current output transconductance amplifier. The opposite input to span generator 12 is connected to the span or feedback current adjustment $R_S$ in series with a null reference voltage $E_N$. The null reference voltage provides a voltage drop equal to the voltage drop across feedback resistor $R_F$ at the zero percent output current level, allowing no current to flow in the span adjustment $R_S$ at the zero percent output level, thereby providing non-interaction of span adjustment. The output current from the span generator occurs only when the voltage drop across the output feedback resistor is greater than the reference voltage $E_N$, and the magnitude of span feedback current is inversely proportional to span adjust $R_S$ and adds to the total charging current to capacitance $C_X$.

As $C_X$ is increased by an amount $\Delta C$, the charging period T increases, the integrated voltage $e_0$ decreases, the output current to the external load increases, and the span generator output increases to restore the charging period T to its original value, hence balancing the integrator output voltage $e_0$ with the period reference voltage $E_P$. Although the feedback arrangement brings the charging period back to its original, even after a change in the tance $C_X$, and the device is non-zerobased which means capacitance $C_X$, and also brings $e_0$ back up to the reference $E_P$, it will be noted that actually the value $e_0$ will be slightly below the value $E_P$ due to a finite gain in the differential amplifier 22.

Thus, the device shown in FIGURE 1 provides an output current proportional to changes in the value of capacitance $C_X$, and the device is non-zero based which means that there is a finite output current for the zero percent or terminal value of the capacitance $C_X$. The capacitance terminal value and the variation in capacitance or span of the system may be controlled by adjustment of potentiometers or variable resistors $R_S$ and $R_Z$. An example of the adjustment is as follows. For a given starting value $C_X$, the potentiometer $R_Z$ is set at a value and the device turned on. The reference voltage $E_N$, which is adjustable, but only need be adjusted once at the factory, is adjusted until there is no voltage appearing across potentiometer $R_S$. The latter condition occurs when reference voltage $E_N$ is equal to the feedback voltage across $R_F$ for the zero percent conditions. A new zero percent or starting capacitance can be achieved subsequently by merely adjusting the potentiometer $R_Z$. The span or capacitance variation for a given operation is then controlled by adjusting $R_S$. It will be noted that the adjustment of $R_S$ will have no effect on the zero adjustment since there is zero current flowing through the span adjust potentiometer $R_S$ when the zero percent conditions are present.

Referring to the schematic shown in FIGURE 2, the variable capactor $C_X$ is in parallel with a very small capacitance $C_6$ whose only purpose is to provide a finite capacitance thereby causing a current output even when the variable capacitance is zero thus enabling a value of zero capacitance for the starting conditions if desired. The current output would represent zero capacitance of the variable capacitance. Input voltage to the circuit is provided from an A.C. source across terminals 30 via a transformer T1 and a fullwave rectifier CR5. The output of the fullwave rectifier is connected to a simple voltage regulating device comprising transistor Q18, Zener diode CR4 and resistor R34. That portion of the circuit including transistors Q11, Q12 and Q13 is the constant current source which provides a constant current output to the emitter of the transistor Q8. The reference voltage $E_Z$ is controlled by Zener diode CR3 and voltage divider R36, R35. The magnitude of the current is controlled by the settings of the zero adjust potentiometers P4 and P3. The constant current flows through the emitter collector path of transistor Q8, which is always biased into conduction, into the variable capactor $C_X$.

Zener diode CR2 provides the reset reference voltage $E_R$ which is connected to the base of transistor Q9 via resistors R20 and R21. The voltage at the base of transistor Q9 will be equal to the reset voltage since transistor Q10 is normally nonconducting. When the voltage on the capacitor reaches the reset level, transistor Q9 goes into conduction thereby creating a discharge path for the charge built up on the capacitor. Transistor Q9 turns on transistor Q10 which operates as a latch to maintain transistor Q9 conducting until the charge on the variable capacitor drops below a preset minimum value determined by the saturation voltage of Q10. In the absence of a latching transistor Q10, the transistor Q9 would turn off almost immediately after it turned on due to the dropping of the voltage on the emitter of Q9 below the reset voltage level. However, the turning on of transistor Q10 drops the voltage on a base of Q9 to the saturation voltage of Q10 thereby providing a much lower voltage to control the turn on time of Q9. The capacitor discharges quickly and the result is a series of negative going pulses at the base of transistor Q9 having a period which is equal to the charge discharge cycle of the capacitance.

The negative going pulses are applied to a reset pulse shaper comprising transistor Q14, Q15, Q16, Q17 and associated circuitry. Normally, Q14 is nonconducting and the base of Q15 is at ground. Q15 is conducting and its collector is positive thereby turning on transistor Q17 and grounding the collector of Q17, which is the output terminal of the reset pulse shaper. When a negative going pulse from the reset amplifier is applied to the base of Q14, that transistor conducts thereby raising the voltage on the base of Q15. Transistor Q15 is cut off and a negative going output pulse at the collector of Q15 is applied to the base of transistor Q17. Transistor Q17 is cut off resulting in a positive going pulse at the output of the reset pulse shaper. The output remains positive until transistors Q17 and Q15 are returned to their normal states. This will not occur until a certain period of time following cutoff of Q14. When Q14 is cut off, transistor Q15 does not immediately go back into conduction because the base terminal of Q15 cannot immediately jump from a value equal to the reset voltage level to ground. When transistor Q14 is cut off, current flows through capacitor C11 and R25 for a period of time determined by the RC time constant of the path and this action maintains Q15 cut off for a preset period of time. The result is that for each negative going reset pulse applied to the base of transistor Q14 there will be a positive going output pulse of preset amplitude and width appearing on the collector of Q17.

The output pulses on the collector of Q17, having a frequency dependent upon the charge and discharge time of the variable capacitor, are applied to an integrator which comprises resistor R1 and capacitor C1. The output of the integrator is applied to the base of the lefthand transistor of transistor pair Q1 and a reference voltage $E_P$ is applied to the base of the other transistor forming transistor pair Q1. The emitters of transistor Q1 are connected together thereby forming a differential circuit. The output of the differential amplifier controls the output current amplifier which comprises transistors Q2, Q3 and Q4. In order for the current amplifier to be turned on at all the output voltage of the integrator, which is designated $E_0$, must be less than $E_P$ and the amount of difference between $E_0$ and $E_P$ determines the amplification in the output current amplifier. The output from the output current amplifier is applied to the output terminals 26 of the overall circuit. A feedback resistor $R_f$ which is connected in series with output terminals 26 has a voltage developed across it which is proportional to the output current.

The circuit of FIGURE 2 includes a means for adjusting the zero percent. A zero percent reading is the output current for a variable capacitor of the minimum value. This may be any value desired. With the zero percent capacitor connected to the circuit the potentiometer P5, which is the null voltage setting, is set so that the voltage on the base of transistor Q6 is equal to the voltage at the tap of potentiometer P5. This result can be detected by measuring the current through the span adjust potentiometers P1 and P2. When the potentiometer P5 is correctly set there will be no current flowing through the span adjust potentiometers. The particular voltage on the tap of the potentiometer P5 which is necessary to achieve the desired condition is determined by the feedback voltage across $R_F$. That is because the feedback voltage is applied to the base of Q5, and since transistors Q5 and Q6 are always conducting, the base of Q5 is at substantially the same potential as the base of Q6. Transistor Q7 and the associated circuitry form a constant current generator.

With the null potentiometer P5 and the zero setting potentiometers P4 and P3 set at the correct values, and with a zero percent capacitor connected in the circuit, all of the current flowing through transistor Q8 will be from the collector of transistor Q11, and the integrator output will be very slightly below $E_P$ thereby providing the minimum output current to the output terminals.

If the variable capacitor is increased, the output current will be increased by the following action of the circuit. An increase in the capacitance results in a decrease in the charge and discharge times of the capacitor thereby increasing the period of the reset pulse train applied to the result pulse shape with a corresponding increase of the period of the pulse train applied to the integrator. The output of the integrator will drop in voltage tending to drive the current amplifier transistors Q2 through Q4 harder in the on condition. As the current output tends to increase, the feedback voltage also increasees causing a greater amount of the curernt from the constant current generator Q7 to be sent through Q5 rather than Q6. The lowering of the current through Q6 drives transistor Q8 harder in the conducting condition causing transistor Q8 to draw additional current. The additional current is drawn through the span adjust potentiometers P2 and P1 and consequently the potentiometers determine the amount of added current per charge in capacitance. As the current to the variable capacitor is increased, the charge and discharge time is reduced resulting in a reduction in the period of the pulse train applied to the integrator. The integrator output voltage then tends to rise back towards the reference level $E_P$. Due to the current amplifier and the differential amplifier having finite rather than infinite gains, the integrator output does not rise to its previous level but is stabilized at a slightly lower level. Thus, for an increase in the variable capacitance, there is an increase in the output current of the circuit. In order to prevent transient surges of current caused by the initial lowering of the integrator output from appearing in the output current, the capacitor C4 is connected between the emitter of transistor Q4 and the base of transistor Q1. The capacitor C4 causes a negative feedback at the base of transistor Q1 which prevents the output of the differential amplifier from rapidly following a too rapid variation in the integrator output.

It will be noted that the additional current needed by transistor Q8 to charge the capacitor is drawn through the span adjust potentiometers P2 and P1. Thus, by moving the setting of the span adjust potentiometers the output current span can thereby be changed. For example, with the potentiometers at one setting, a given change in capacitance will result in an increase of X amps in the output current, whereas for another setting the same change in the capacitance will result in an increase of 2X amps in the output current.

The circuitry described above thus results in an improved capacitance to current transducer which has non-interacting potentiometric adjustments for zero and span. The potentiometric adjustments may thus be controlled at remote locations from the device itself providing a very useful feature.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A capacitance to current transducer comprising;
   a variable capacitor, a constant current generator for charging said variable capacitor, means responsive to the voltage developed across said variable capacitor for periodically discharging said capacitor thereby providing a periodic charge-discharge cycle for said variable capacitor, means for providing a D.C. voltage proportional to the time of each cycle, an output current amplifier, a high gain differential amplifier means responsive to said D.C. voltage and a preset reference voltage for driving said output current amplifier, and feedback means responsive to the output current from said output current amplifier for generating a supplemental charging current which is applied to said variable capacitor, said feedback means including means for adjusting the span of said transducer and said constant current generator including zero adjusting means for adjusting the output current of said constant current generator, said span and zero adjusting means being independent of each other.

2. A capacitance to current transducer as claimed in claim 1 wherein said span adjusting means is a variable resistance and said feedback means comprises a transconductance differential amplifier having first and second voltage input terminals and a current output terminal, a feedback resistor in series with the output from said output current amplifier, means for connecting the voltage across said feedback resistor to one of said voltage input terminals, means for generating a null reference voltage and for connecting said null reference voltage through said span adjusting means to the other of said voltage input terminals, whereby said output current level for zero percent capacitance is equal to the current value necessary for the feedback voltage to equal said null reference voltage.

3. A capacitance to current transducer as claimed in claim 2 wherein said zero adjusting means is a variable resistance.

4. A capacitance to current transducer as claimed in claim 3 wherein said means for periodicaly discharging said capacitor comprises:
   a switch means, connected to said capacitor, for discharging said capacitor down to a preset lower limit in response to the voltage on said capacitor reaching a preset upper limit.

References Cited

UNITED STATES PATENTS

| | | | |
|---|---|---|---|
| 2,551,964 | 5/1951 | Norton | 324—111 |
| 3,159,825 | 12/1964 | Bianchi et al. | 324—111 |

OTHER REFERENCES

Foldvari, Tibor L., and Kurt S. Lion, Capacitive Transducers In Instruments and Control Systems, vol. 37, pp. 77, 78, November 1964.

EDWARD E. KUBASIEWICZ, Primary Examiner

J. M. HANLEY, Assistant Examiner

U.S. Cl. X.R.

324—111